(12) United States Patent
Salazar

(10) Patent No.: US 11,639,706 B1
(45) Date of Patent: May 2, 2023

(54) FLOW CONTROL MEMBER FOR A VEHICLE

(71) Applicant: NISSAN NORTH AMERICA, INC., Franklin, TN (US)

(72) Inventor: Manuel Salazar, Toluca (MX)

(73) Assignee: NISSAN NORTH AMERICA, INC., Franklin, TN (US)

(*) Notice: Subject to any disclaimer, the term of this patent is extended or adjusted under 35 U.S.C. 154(b) by 0 days.

(21) Appl. No.: 17/515,285

(22) Filed: Oct. 29, 2021

(51) Int. Cl.
*F02M 35/10* (2006.01)
*F02M 35/104* (2006.01)

(52) U.S. Cl.
CPC .... *F02M 35/10262* (2013.01); *F02M 35/104* (2013.01)

(58) Field of Classification Search
CPC .... F02M 35/04; F02M 35/12; F02M 35/1216; F02M 35/1211; F02D 9/104
See application file for complete search history.

(56) References Cited

U.S. PATENT DOCUMENTS

| | | | | |
|---|---|---|---|---|
| 7,730,997 | B2* | 6/2010 | Asada | F02M 35/1216 181/258 |
| 8,607,757 | B2* | 12/2013 | Kusuda | F02M 35/1227 123/184.41 |
| 9,500,166 | B2* | 11/2016 | Yoshitsune | F02M 35/1216 |

* cited by examiner

*Primary Examiner* — Syed O Hasan
(74) *Attorney, Agent, or Firm* — Global IP Counselors, LLP

(57) ABSTRACT

A flow control member for a vehicle includes a body, a plurality of mounting tabs, and a panel member. The body has an outer surface and an inner surface. An air passage through the body is defined by the inner surface. A plurality of mounting tabs extends outwardly from the outer surface of the body. Each of the mounting tabs is configured to receive a fastener to connect the flow control member to an intake passage of the vehicle. A panel member is disposed in the air passage. The panel member defines a plurality of openings therethrough.

15 Claims, 5 Drawing Sheets

FLOW CONTROL MEMBER FOR A VEHICLE

BACKGROUND

Technical Field

The present disclosure generally relates to a flow control member for a vehicle. More specifically, the present disclosure relates to a flow control member disposed between a throttle valve and an intake manifold to provide laminar flow characteristics to air flowing therethrough.

Background Information

An air intake system of a vehicle includes an air intake passage supplying air to an intake manifold of an internal combustion engine. A throttle valve is disposed in the air intake passage upstream of the air intake manifold. The throttle valve controls the flow of air into the intake manifold. The air passing through the throttle valve can become turbulent. The turbulent air flow reduces air flow distribution in the intake manifold, which results in a pressure loss and a decreased volumetric efficiency in the internal combustion engine, thereby reducing engine performance.

SUMMARY

A need exists for a flow control member for a vehicle that controls the flow of air downstream of a throttle valve of an air intake system.

In view of the state of the known technology, one aspect of the present disclosure is to provide a flow control member for a vehicle. The flow control member includes a body, a plurality of mounting tabs, and a panel member. The body has an outer surface and an inner surface. An air passage through the body is defined by the inner surface. A plurality of mounting tabs extends outwardly from the outer surface of the body. Each of the mounting tabs is configured to receive a fastener to connect the flow control member to an intake passage of the vehicle. A panel member is disposed in the air passage. The panel member has a plurality of openings extending therethrough.

Another aspect of the present disclosure is to provide an air intake system for a vehicle. The air intake system includes an intake manifold, an intake passage, a throttle valve, and a flow control member. The intake passage is configured to supply air to the intake manifold. The throttle valve is disposed in the intake passage. The flow control member is disposed between the throttle valve and the intake manifold. The flow control member includes a body having an outer surface and an inner surface. An air passage through the body is defined by the inner surface. A panel member is disposed in the air passage. The panel member has a plurality of openings extending therethrough.

Also other objects, features, aspects and advantages of the disclosed flow control member for a vehicle will become apparent to those skilled in the art from the following detailed description, which, taken in conjunction with the annexed drawings, discloses exemplary embodiments of the flow control member for a vehicle.

BRIEF DESCRIPTION OF THE DRAWINGS

Referring now to the attached drawings which form a part of this original disclosure.

DETAILED DESCRIPTION OF EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
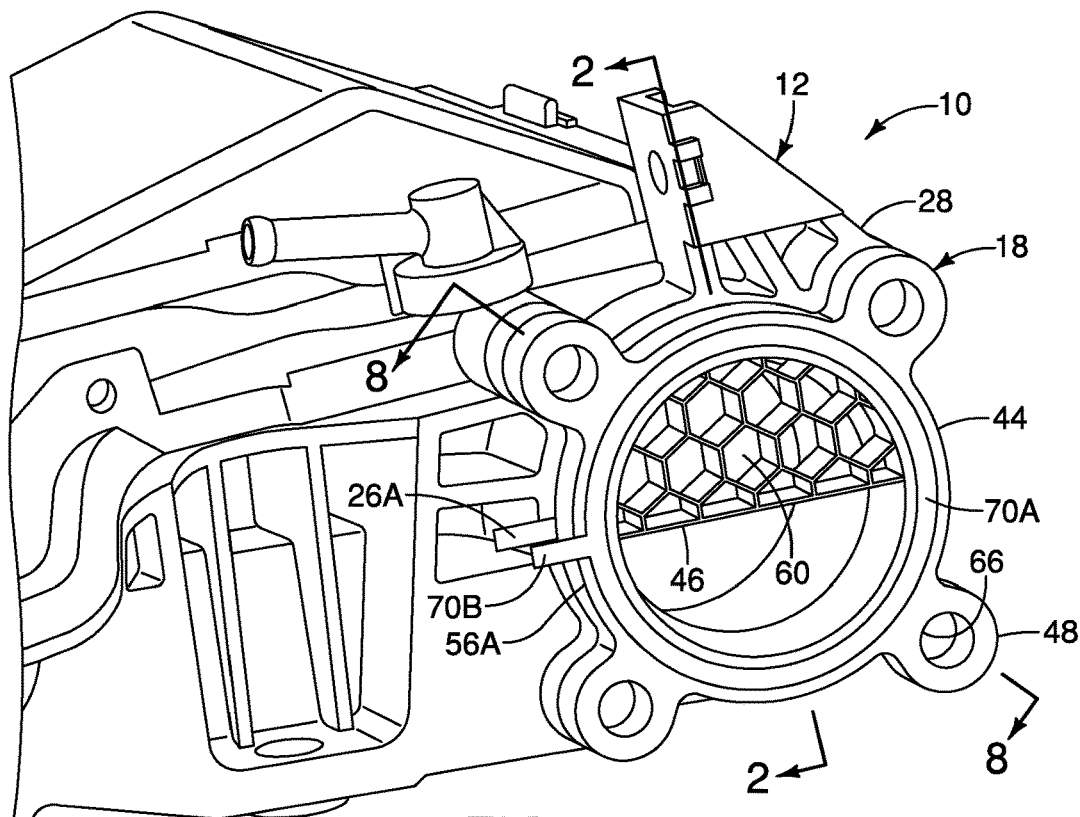
FIG. 1 is a perspective view of a flow control member connected to an intake manifold of a vehicle in accordance with an exemplary embodiment.
Figure 2:
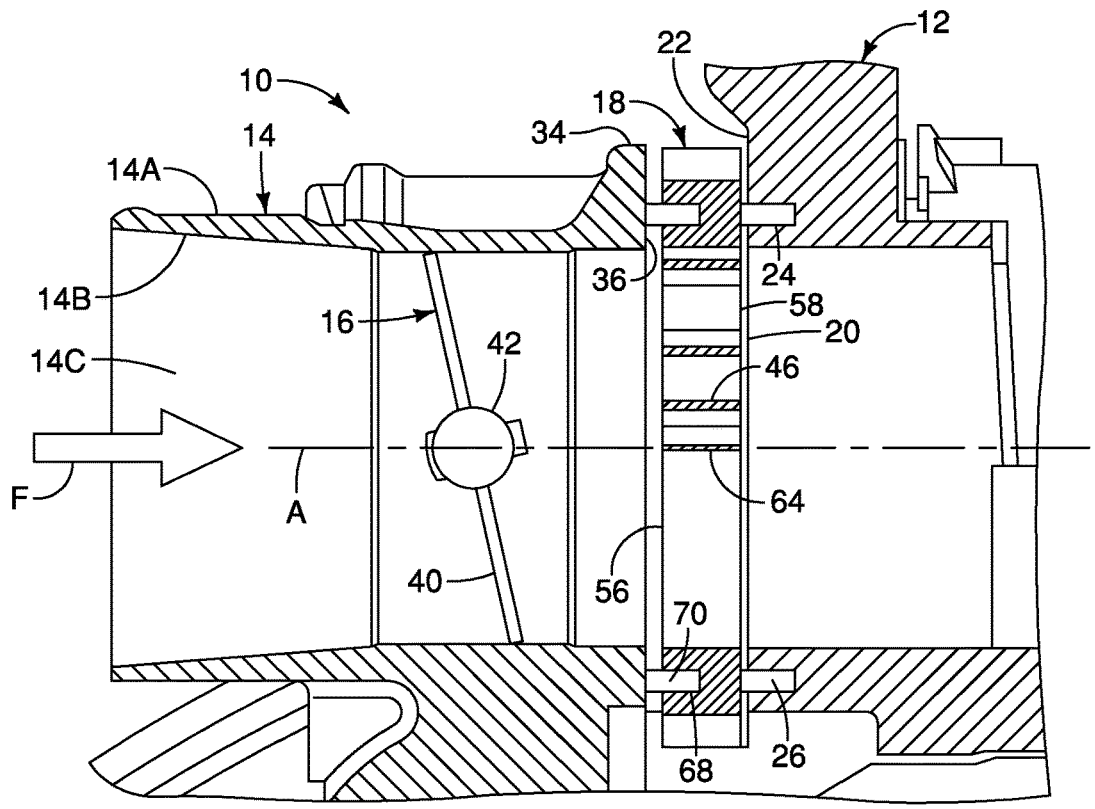
FIG. 2 is an elevational view in cross section of an air intake system taken along line 2-2 of FIG. 1 in which the flow control member is disposed between a throttle valve and the intake manifold.
Figure 3:
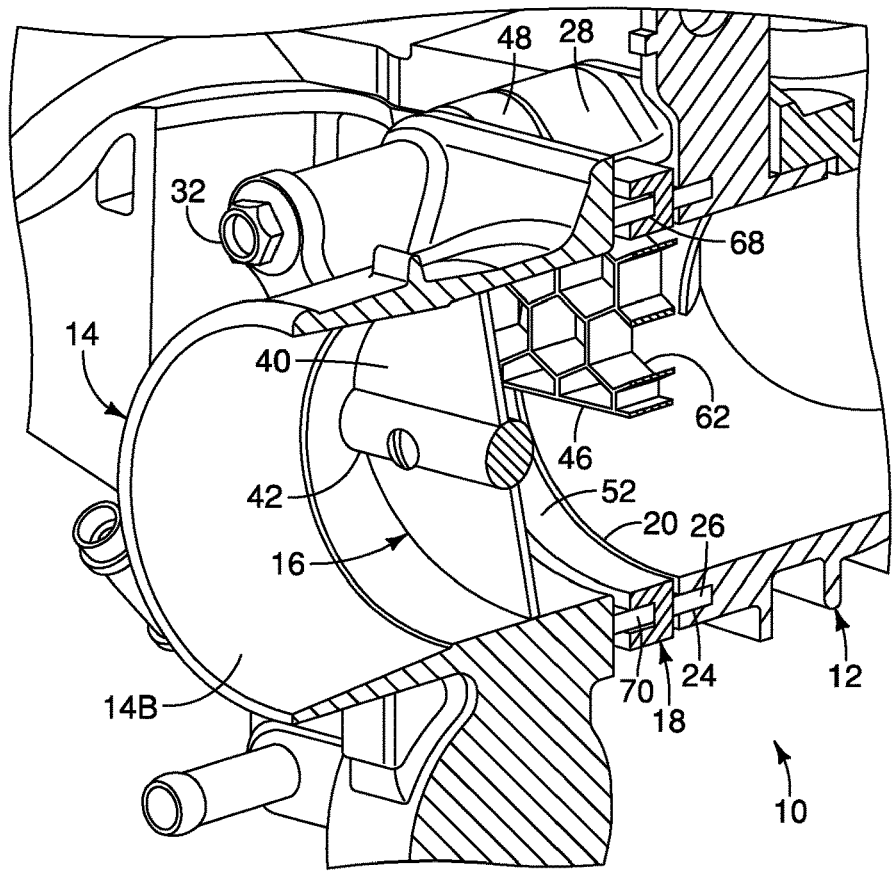
FIG. 3 is a perspective view in cross section of the air intake system of FIG. 2.

Referring initially to FIGS. 1-3, an air intake system 10 includes an air intake manifold 12, an air intake passage 14, a throttle valve 16, and a flow control member 18. The intake passage 14 is configured to supply air to the intake manifold 12. The throttle valve 16 is disposed in the intake passage 14 to regulate, or control, the supply of air to the intake manifold 12. The flow control member 18 is disposed between the throttle valve 16 and the intake manifold 12 to control the flow of air entering the intake manifold 12. The flow control member 18 imparts laminar flow characteristics to the air passing through the flow control member 18.

Figure 7:
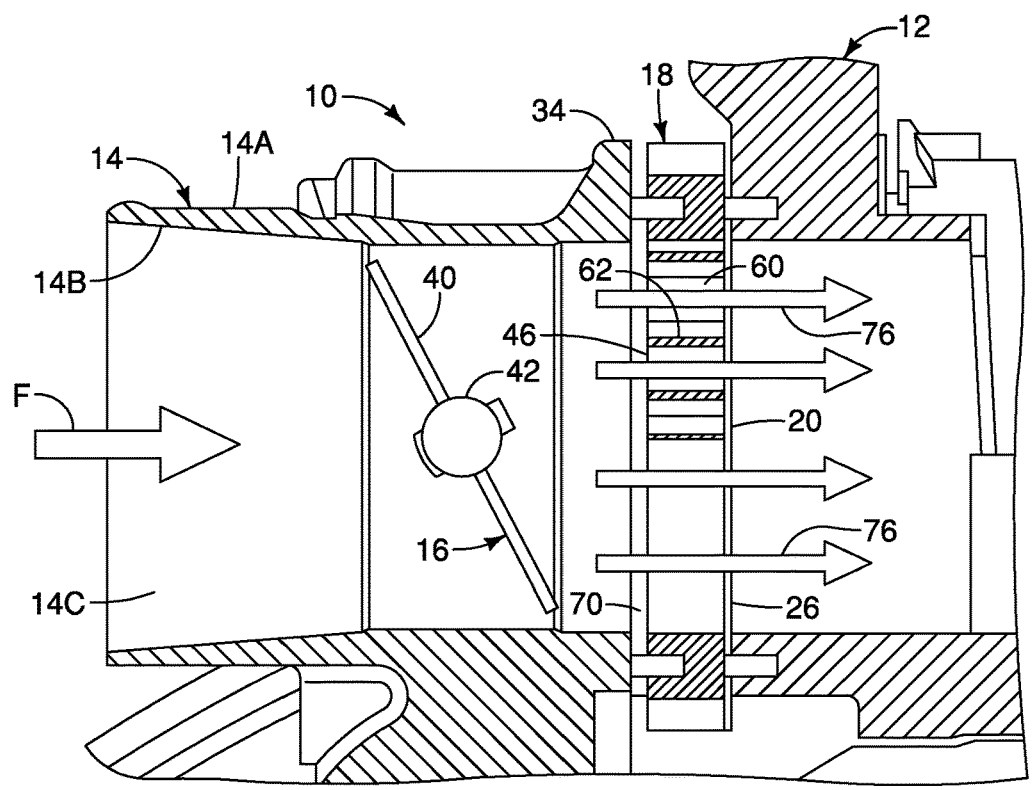
FIG. 7 is an elevational view in cross section of a laminar air flow through the flow control member of FIG. 2.
Figure 8:
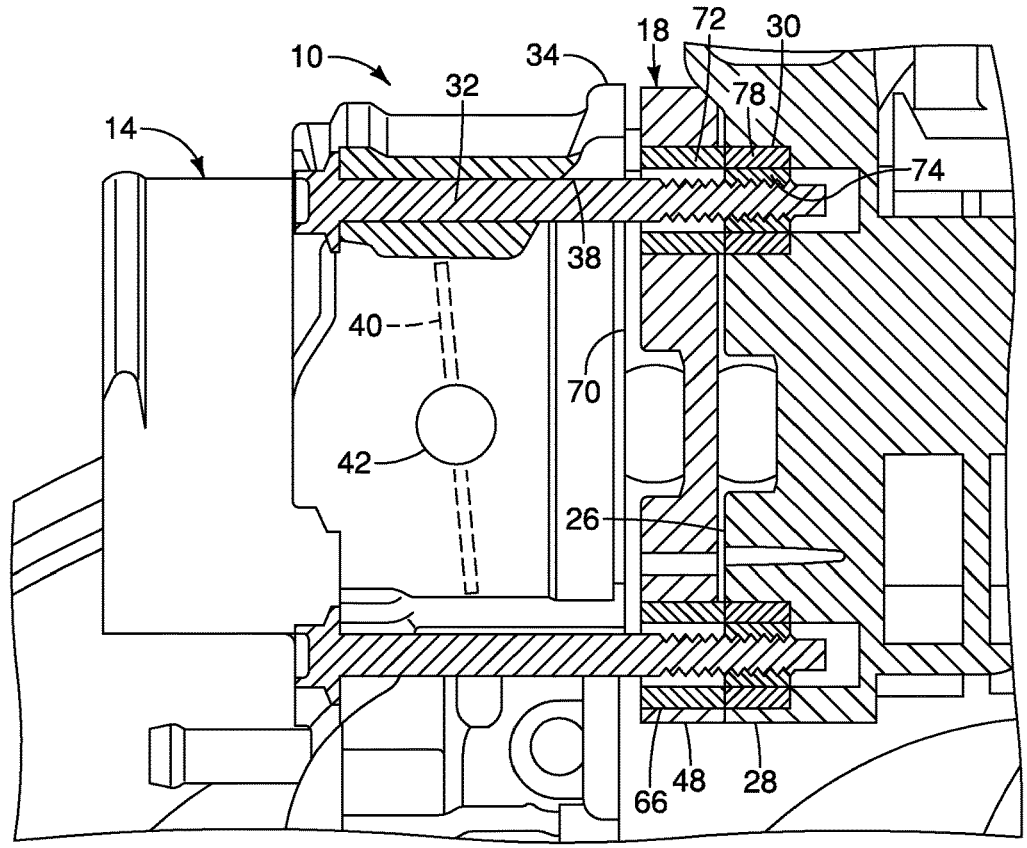
FIG. 8 is an elevational view in cross section of the air intake system taken along line 8-8 of FIG. 1 illustrating the flow control member connected between the air intake passage and the air intake manifold.

The intake manifold 12, as shown in FIGS. 1 and 3, receives air from the intake passage 14 and transmits the air to the engine cylinders for combustion with fuel. An air inlet 20 is disposed in an axial face 22 of the intake manifold 12. A circumferential groove 24 is disposed in the axial face 22 of the intake manifold 12. The circumferential groove 24 completely surrounds the inlet 20, and is configured to receive a first sealing member 26, such as a gasket. The intake manifold 12 includes a plurality of mounting tabs 28 disposed outwardly of the air inlet 20. Each mounting tab 28 has a fastener opening 30 configured to receive a fastener 32, as shown in FIG. 7.

Figure 9:
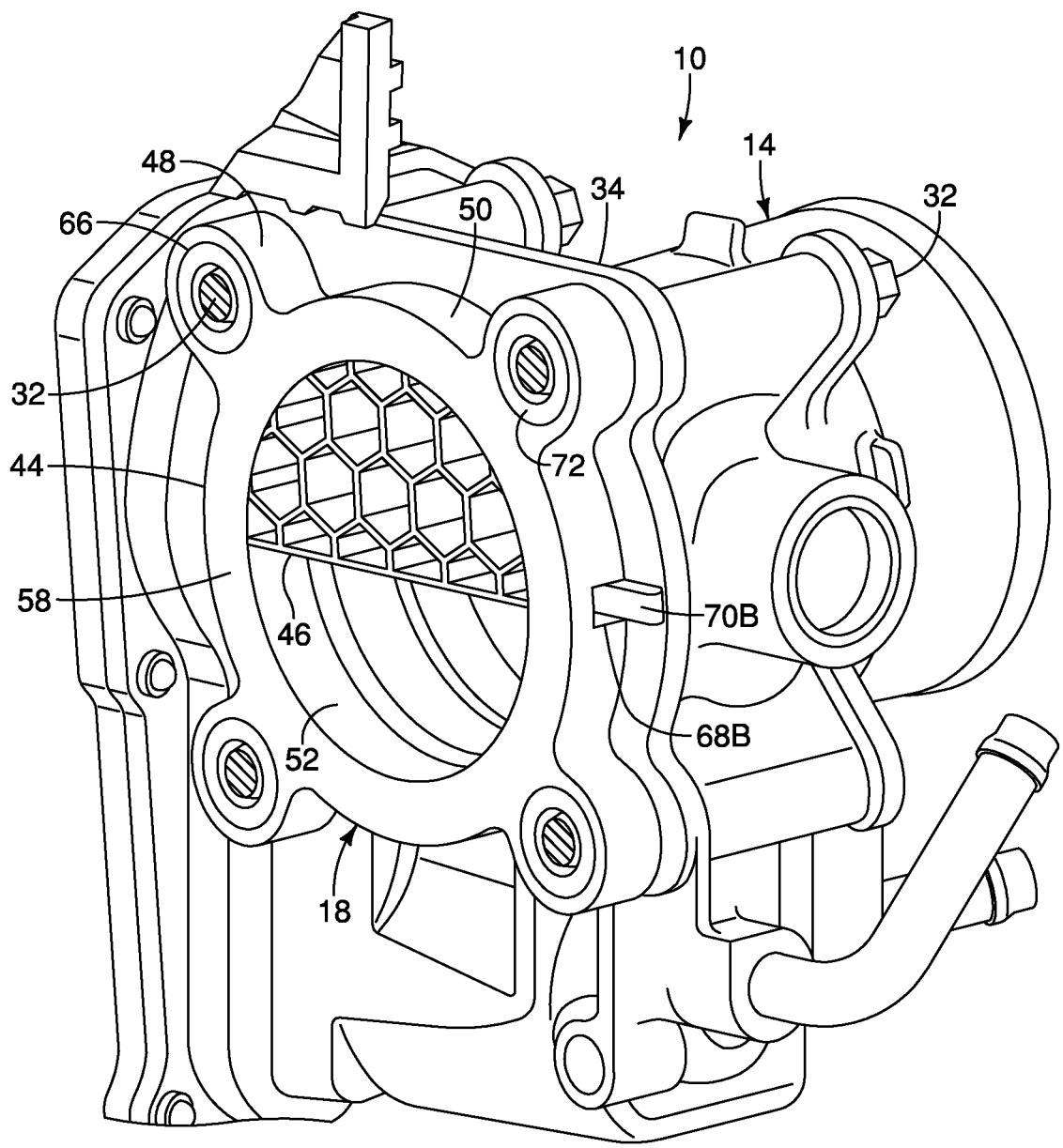
FIG. 9 is a rear perspective view of the flow control member connected to the air intake passage of FIG. 3.

The air intake passage, or air intake tube, 14 supplies air to the throttle valve 16 disposed upstream of the inlet 20 of the intake manifold 12, as shown in FIGS. 2, 3, 7 and 8. The air intake passage 14 has an outer surface 14A and an inner surface 14B. The inner surface 14B defines an air passage 14C through which the air is supplied to the intake manifold 12. A flange 34 is disposed at an end of the intake passage 14, as shown in FIGS. 2 and 9. The flange 34 has an axial face 36. A plurality of fastener openings 38 are disposed in the axial face 36.

The throttle valve 16 includes a throttle body 40 fixed to a shaft 42, as shown in FIGS. 2 and 3. The shaft 42 is rotatably mounted in the intake passage 14. The shaft 42 extends in a direction substantially perpendicular to a longitudinal axis A of the intake passage 14. The throttle body 40 is a substantially planar member fixed to the throttle shaft 42 in any suitable manner such that the throttle body 40 rotates with the shaft 42. The throttle valve 16 is configured to be moved from a closed position in which air is substantially prevented from passing through the throttle valve 16 to an open position in which the amount of air flowing to the intake manifold 12 is regulated. Referring to FIG. 2, the throttle body 40 is positioned substantially vertically to close the air passage 14C in the air intake passage 14 to substantially prevent the flow of air to the intake manifold. The shaft 42 rotates in a counter-clockwise direction to allow air to pass through the throttle valve 16 to regulate the supply of air to the intake manifold 12. The throttle valve 16 is controlled in a conventional to regulate the supply of air to the intake manifold 12.

The flow control member 18 is disposed between the throttle valve 16 and the intake manifold 12, as shown in FIGS. 2, 3, 7 and 8. The flow control member 18 includes a body 44, a panel member 46, and a plurality of mounting tabs 48. The flow control member 18 is preferably integrally formed as a one-piece member. In other words, the body 44, the panel member 46 and the plurality of mounting tabs 48 are integrally formed as a one-piece member. The body 44, the panel member 46 and the mounting tabs 48 of the flow control member 18 are made of any suitable material, such as a plastic material. Preferably, the flow control member is made of a thermoplastic, such as a glass fiber reinforced polyamide resin. The flow control member 18 is preferably made by injection molding as a one-piece member.

Figure 4:
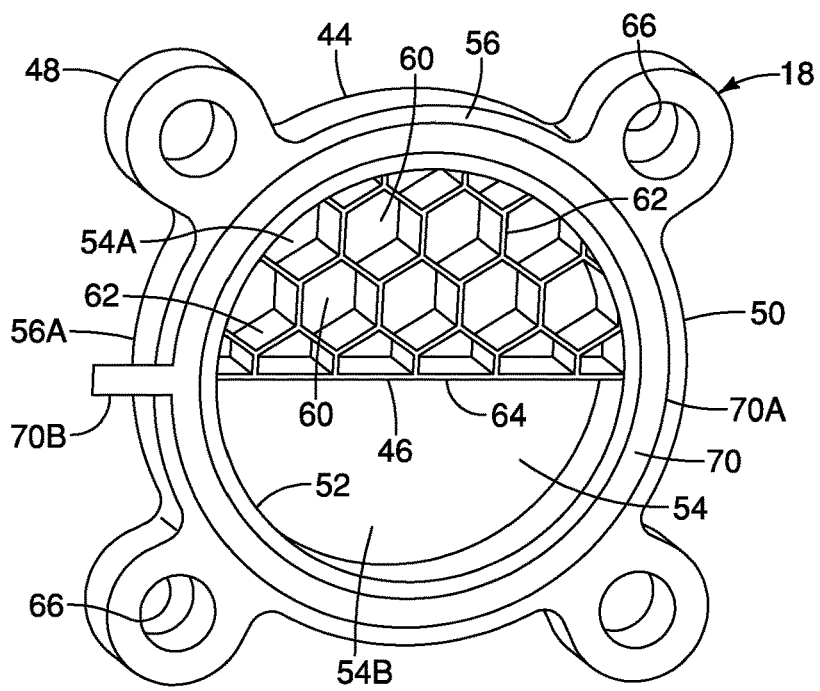
FIG. 4 is a perspective view of the flow control member of FIG. 2.
Figure 5:
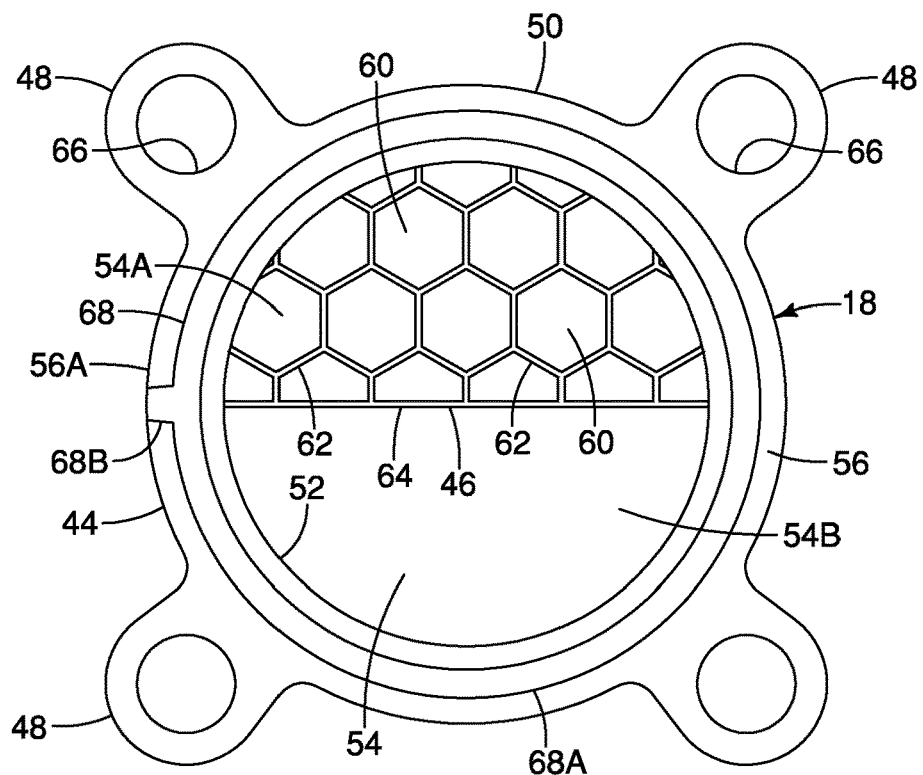
FIG. 5 is a front elevational view of the flow control member of FIG. 4.
Figure 6:
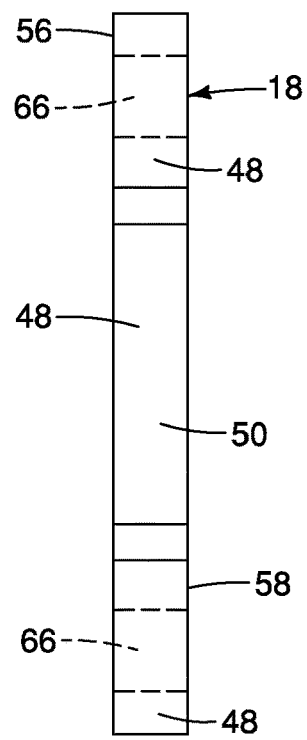
FIG. 6 is a side elevational view of the flow control member FIG. 4.

The body 44 of the flow control member 18 has an outer surface 50 and an inner surface 52, as shown in FIGS. 4-6. An air passage 54 through the body 44 of the flow control member 18 is defined by the inner surface 52. The inner surface 52 preferably defines a substantially circular air passage 54 when viewed in the direction of the longitudinal axis A, as shown in FIGS. 2 and 5. The air passage 54 extends from a first axial facing surface 56 of the body 44 to a second axial facing surface 58.

The panel member 46 of the flow control member 18 is disposed in the air passage 54 of the flow control member 18, as shown in FIGS. 4-6. The panel member 46 has a plurality of openings 60 disposed therein. The panel member 46 is formed of a plurality of panels 62 connected together to form the plurality of openings 60 through the panel member 46. The plurality of openings 60 preferably have a substantially hexagonal shape.

A lowermost panel 64 extends across an entirety of the air passage 54 in the flow control member 18, as shown in FIGS. 4 and 5. The lowermost panel 64 separates a first portion 54A of the air passage 54 from a second portion 54B of the air passage 54. The panel member 46 is disposed in the first portion 54A of the air passage 54. The second portion 54B of the air passage 54 does not have the panel member 46 disposed therein. The panel member 46 covers approximately fifty percent of the air passage 54. In other words, the panel member 46 is disposed in an upper half of the air passage 54, and the lower half of the air passage 54 does not have the panel member 46 disposed therein.

Each of the plurality of mounting tabs 48 of the flow control member 18 extends outwardly from the outer surface 50 of the body 44, as shown in FIGS. 4-6. A fastener opening 66 is disposed in each of the mounting tabs 48 and is configured to receive the fastener 32 to connect the flow control member 18 to the intake passage 14 of the vehicle. Each fastener opening 66 extends from the first axial facing surface 56 to the second axial facing surface 58.

A groove 68 is disposed in the first axially facing surface 56 of the body 44 of the flow control member 18, as shown in FIG. 5. The groove 68 surrounds an entirety of the air passage 54 in the body 44 of the flow control member 18. The groove 68 has a first portion 68A that is substantially circular and a second portion 68B that extends radially outwardly from the first portion 68A of the groove 68. The second portion 68B of the groove 68 extends radially from the first portion 68A to an outer peripheral edge 56A of the first axially facing surface 56 of the body 44 of the flow control member 18.

A second sealing member 70 is disposed in the groove 68 in the first axially facing surface 56 of the body 44 of the flow control member 18, as shown in FIGS. 2-4 and 7-9. The second sealing member 70 has a first portion 70A that is substantially circular and a second portion 70B that extends radially outwardly from the first portion 70A of the second sealing member 70. The first portion 70A of the second sealing member 70 is received by the first portion 68A of the groove 68. The second portion 70B of the second sealing member 70 is received by the second portion 70B of the groove 68. The second portion 70B of the second sealing member 70 is a tab that extends outwardly beyond the outer peripheral edge 56A of the first axially facing surface 56 of the body 44. The first sealing member 26 is preferably substantially identical to the second sealing member 70. The first and second sealing members 26 and 70 are made of any suitable material, such as a rubber material. The first and second sealing members 26 and 70 are preferably made of a nitrile rubber.

As shown in FIGS. 2, 3, 7 and 8, the flow control member 18 is disposed between the intake passage 14 and the intake manifold 12 in the air flow direction Fr. The flow control member 18 is disposed between the throttle valve 16 and the intake manifold 12 in the air flow direction.

The flow control member 18 is connected to an end of the intake passage 14, as shown in FIGS. 2, 3 and 7-9. A first axial facing surface 56 of the flow control member 18 is positioned to face the axial face 36 of the flange 34 at the end of the intake passage 14. The plurality of fastener openings 66 in the mounting tabs 18 of the flow control member 18 are aligned with the plurality of fastener openings 38 in the flange 34 of the intake passage 14.

The second axial facing surface 58 of the flow control member 18 is positioned to face the axial face 22 at the inlet 20 of the intake manifold 12, as shown in FIGS. 1-3, 7 and 8. The plurality of fastener openings 66 in the mounting tabs 18 of the flow control member 18 are aligned with the plurality of fastener openings 30 in the mounting tabs 28 of the intake manifold 12.

The fastener openings 38 in the flange 34 of the intake passage 14, the fastener openings 66 in the mounting tabs 18 of the flow control member 18, and the fastener openings 30 in the mounting tabs 28 of the intake manifold 12 are aligned to receive the fasteners 32 to secure the air intake passage 14 to the intake manifold 12 with the flow control member 18 disposed therebetween. Collars 72 and collars 74 may be disposed in the fastener openings 66 in the mounting tabs 18 of the flow control member 18 and in the fastener openings 30 in the mounting tabs 28 of the intake manifold 12, respectively, to facilitate receiving the fasteners 32. A threaded insert 78 is disposed in the fastener opening 30 in the fastener opening 30 in the mounting tab 28 of the intake manifold 12 to receive a threaded portion of the fastener 32.

As shown in FIGS. 2 and 7, a first sealing member 26 is disposed between the axial face 22 of the intake manifold 12 and the second axial facing surface 58 of the flow control member 18. A second sealing member 70 is disposed between the first axial facing surface 56 of the flow control member 18 and the axial face 36 of the flange 34 of the intake passage 14. The first and second sealing members 26 and 70 are compressed between the respective mating surfaces as the fasteners 32 are tightened in the respective fastener openings 38, 66 and 30 in the intake passage 14, the flow control member 18 and the intake manifold 12 to substantially prevent leakage of air flowing through the intake passage 14, the flow control member 18 and the intake manifold 12. The second portion 70B of the second sealing member 70 extends externally of the body 44 of the flow control valve, as shown in FIGS. 1, 4 and 9, to properly position the sealing member 70 in the groove 68 (FIG. 5) of the flow control valve 18 and to indicate that the sealing member 70 is disposed in the flow control member 18 when the flow control member 18 is connected between the intake passage 14 and the intake manifold 12. The second sealing member 26 has a similar tab, as shown in FIG. 1. As shown in FIG. 2, a diameter of the air passage 14C of the intake passage 14, a diameter of the air passage 54 of the flow control member 18 and a diameter of the air inlet 20 of the intake manifold 12 are substantially equal proximate the flow control member 18.

The position of the throttle body 40 of the throttle valve 16 is adjusted in a conventional manner to control the flow of air to the intake manifold 12. The air flowing through the panel member 46 of the flow control member 18 is provided with laminar flow characteristics, as indicated by flow arrows 76 in FIG. 7, to the air flowing into the inlet of the intake manifold 12. In other words, the turbulence of the air flowing through the throttle valve 16 is substantially reduced by the flow control member 18. By providing laminar flow characteristics to the air flowing to the intake manifold 12, the pressure loss is reduced and the volumetric efficiency is increased in the internal combustion engine, thereby improving engine performance.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below" and "transverse" as well as any other similar directional terms refer to those directions of a vehicle equipped with the hybrid door seal. Accordingly, these terms, as utilized to describe the present invention should be interpreted relative to a vehicle equipped with the flow control member.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A flow control member for a vehicle comprising: a body having an outer surface and an inner surface, an air passage through the body being defined by the inner surface; a plurality of mounting tabs extending outwardly from the outer surface of the body, each of the mounting tabs being configured to receive a fastener to connect the flow control member to an intake passage of the vehicle; and a panel member disposed in the air passage and covering approximately fifty percent of the air passage, the panel member having a plurality of substantially hexagonally shaped openings extending therethrough, the body, the plurality of mounting tabs and the panel member being integrally formed as a one-piece member.

2. The flow control member according to claim 1, wherein a groove is disposed in an axially facing surface of the body.

3. The flow control member according to claim 1, wherein the groove surrounds an entirety of the air passage in the body.

4. The flow control member according to claim 3, wherein a seal member is disposed in the groove.

5. The flow control member according to claim 4, wherein the seal member includes a tab that extends externally of the body.

6. The flow control member according to claim 1, wherein the air passage has a substantially circular shape when viewed in an axial direction.

7. The flow control member according to claim 1, wherein the air passage includes a first portion in which the panel member is disposed and a second portion in which the panel member is not disposed.

8. The flow control member according to claim 1, wherein the body and the panel member are made of a plastic material.

9. An air intake system for a vehicle comprising: an intake manifold; an intake passage configured to supply air to the intake manifold; a throttle valve disposed in the intake passage; and a flow control member disposed between the throttle valve and the intake manifold, the flow control member including a body having an outer surface and an inner surface, an air passage through the body being defined by the inner surface; a plurality of mounting tabs extending outwardly from the outer surface of the body, each of the plurality of mounting tabs being connected to the intake passage and to the intake manifold; a panel member disposed in the air passage, the panel member having a plurality of substantially hexagonally shaped openings extending therethrough; a first sealing member disposed between the flow control member and the intake manifold, the first sealing member being disposed in a groove in the intake manifold; and a second sealing member disposed between the flow control member and the intake passage, the second sealing member being disposed in a groove in the flow control member.

10. The air intake system according to claim 9, wherein each of the mounting tabs receiving a fastener to connect the flow control member to the intake passage and to the intake manifold.

11. The air intake system according to claim 9, wherein a groove is disposed in an axially facing surface of the body and surrounds an entirety of the air passage in the body.

12. The air intake system according to claim 11, wherein a seal member is disposed in the groove.

13. The air intake system according to claim 9, wherein the air passage includes a first portion in which the panel member is disposed and a second portion in which the panel member is not disposed.

14. The air intake system according to claim 9, wherein the panel member is disposed upstream of an inlet of the intake manifold.

15. The air intake system according to claim 9, wherein the body and the panel member are integrally formed as a one-piece member.

* * * * *